UNITED STATES PATENT OFFICE.

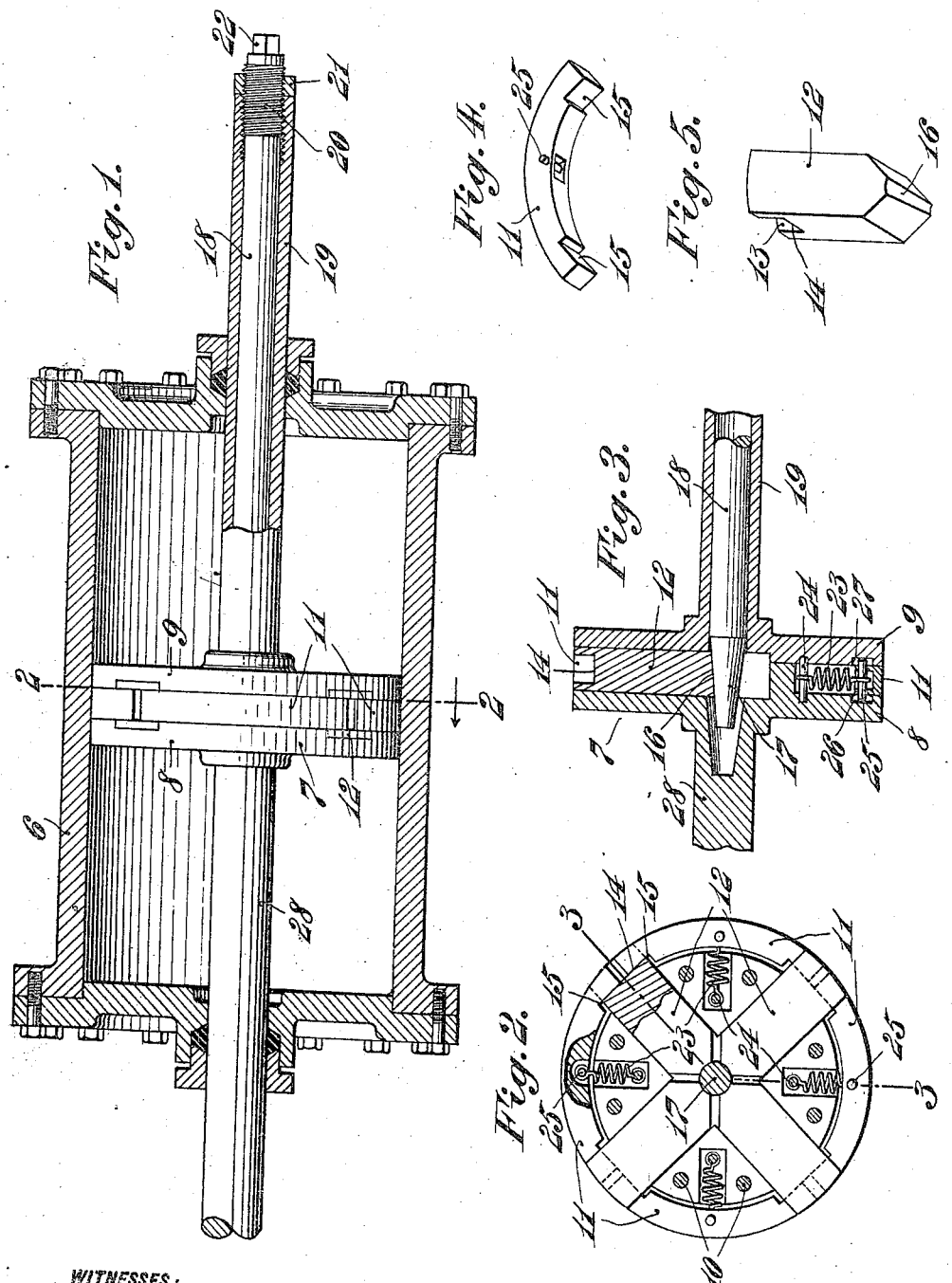

ROBERT A. FOWDEN, OF PHILADELPHIA, PENNSYLVANIA.

PISTON-PACKING.

976,563.  Specification of Letters Patent.  Patented Nov. 22, 1910.

Application filed May 4, 1909. Serial No. 493,831.

*To all whom it may concern:*

Be it known that I, ROBERT A. FOWDEN, a citizen of the United States, residing at Philadelphia, in the county of Philadelphia and State of Pennsylvania, have invented certain new and useful Improvements in Piston-Packing, of which the following is a specification.

My invention relates to a piston packing, and in such connection it has particular relation to a metallic packing for steam or other engines, pumps, or the like, and which is capable of positive adjustment.

The object of my invention is to provide a simple, durable and efficient metallic packing for steam or other engines, pumps, or the like, which may be readily and positively adjusted without dismantling the engine, so that proper adjustment may be had to suit desired conditions.

It is well known that the various types of split or spring ring and similar metallic packing commonly in use in steam engines are not applicable to all conditions, and it is also well known that in the ordinary form of split or spring ring packing, the resiliency of the spring is lost in the course of time due to the wearing of the ring, so that recourse has been had to various other forms of metallic packing wherein dependence was placed on helical or other springs forcing the metallic packing outward at various parts of the circumference of the same. With these forms of packing, however, a disadvantage occurs due to the difference of the pressure of the several springs employed so that uniformity of the pressure of the packing against the cylinder does not exist at all points. It has long been known to steam engineers that if a piston be employed having the proper relationship in diameter to the interior diameter of the cylinder, and if such conditions could be maintained in practice, that no packing would be required, as with an infinitely small clearance sufficient only to allow the piston to reciprocate in the cylinder, no leakage would occur past the piston, which condition, however, could not be maintained in practice due to the wear resulting from the reciprocating motion.

My invention, therefore, contemplates a piston packing which is adapted to be maintained at a theoretically perfect clearance point, means being provided to take up the wear resulting from the reciprocating motion as aforesaid.

The nature and characteristic features of my invention will be more clearly understood from the following description taken in connection with the accompanying drawings, forming part hereof, in which, Figure 1 is a vertical, central, sectional view of a steam or other engine cylinder, and a piston mounted therein containing the packing embodying the main features of my present invention; Fig. 2 is a transverse section of the piston shown in Fig. 1, taken approximately on the line 2—2 of Fig. 1; Fig. 3 is a longitudinal, central section of said piston, taken approximately on the line 3—3 of Fig. 2; Fig. 4 is a perspective view of one of the sector packing elements of my present invention; and Fig. 5 is a perspective view of one of the bridge and adjusting elements of the device.

In the particular embodiment of my invention shown in the drawings, 6 is an engine cylinder of any preferred type, in which is mounted the piston 7, consisting preferably of two cylindrical disk like member 8 and 9, suitably grooved and channeled to receive the elements of the piston packing, these members 8 and 9 being secured together in any suitable manner such as the bolts 10 passing therethrough. The packing proper consists of a series of sector members 11 mounted in a peripheral groove in the assembled piston 7, the adjoining ends of the sector members 11 being slidably supported in the outer end of a bridging and adjusting piece 12, which is grooved as at 15 at its outer end to receive the ends of the sector members 11. The groove 13 of the bridging piece 12 is preferably made with a square base 14, and the ends of the sector members 11 are recessed as at 15 complemental to the square base 14 of the groove 13 of the bridging piece 12. The bridging and adjusting pieces 12 are arranged radially, as shown in Fig. 2, and are provided with a tapered bearing surface 16 at their inner ends, which tapered bearing surface is adapted to rest against the conical end 17 of the spindle 18, extending through the hollow tail rod 19, which is secured to or integral with the rear portion of the piston 7. The outer end of the spindle 18 is threaded as at 20, and the end of the interior of the tail rod 19 is complementally threaded to receive the threaded portion 20 of the spindle 18. The lock nut 21 serves to lock the spindle 18 in any desired adjusted position, and the extreme outer end of the spindle 18 may be provided with a square head 22 or other suitable means for turning the same to adjust the structure. The sector members 11 are normally held retracted to the innermost limit permitted by the adjusting and bridging pieces 12 by means of helical tension springs 23, which are secured at their inner ends to pins 24 mounted in the piston, and at their outer ends to pins 25 mounted in the sector members 11. To prevent circumferential motion of the sector members 11, whereby the same would not remain in the proper relationship with respect to the square base of the grooves 13 of the bridging and adjusting pieces 12, the pins 25 project beyond the side faces of the sector members 11 into grooves 26 and 27 formed respectively in the interior of the disks 8 and 9 constituting the piston 7.

It will now be seen that the helical tension springs 23, normally tending to retract the sector members 11, will cause said sector members at their respective ends to bear against the base 14 of the groove 13 of the bridging and adjusting pieces 12 thereby forcing said pieces 12 to contact at their interior ends 16 against the tapered end 17 of spindle 18. It will thus be understood that if the square end 22 of the spindle 18 be engaged and turned by a wrench or other suitable means, the tapered portion 17 may be advanced as desired to force the bridging and adjusting pieces 12 and the sector members 11 outward to any desired position so that the packing of the piston 7 may be readily adjusted as desired to suit the conditions under which the engine may be working. In the initial construction of an engine containing the piston packing of the present invention, it is desirable, for the best results, that the assembled piston and packing be turned or machined to a diameter corresponding to the theoretical clearance dimension with respect to the cylinder in which it is to work. It will, of course, be understood that the spindle 18 may, if desired, be arranged in the interior of the piston rod 28 instead of in the interior of the tail rod 19.

Having thus described the nature and characteristic features of my invention, what I claim as new and desire to secure by Letters Patent is:

1. A piston packing comprising a plurality of rigid sector members, a plurality of non-resilient bridging and adjusting pieces in which the ends of said sector members are mounted, and positive means for adjusting said bridging and adjusting pieces and sector members.

2. A piston packing comprising a plurality of rigid sector members, a plurality of non-resilient bridging and adjusting pieces in which the ends of said sector members are mounted, and positive means for simultaneously adjusting said bridging and adjusting pieces and sector members.

3. A piston packing comprising a plurality of rigid sector members, a plurality of non-resilient bridging and adjusting pieces in which the ends of said sector members are mounted, and positive means extending external to the cylinder for adjusting said bridging and adjusting pieces and sector members.

4. A piston packing comprising a plurality of rigid sector members, a plurality of non-resilient bridging and adjusting pieces in which the ends of said sector members are mounted, and a tapered member engaging said bridging and adjusting pieces for simultaneously controlling the same.

5. A piston packing comprising a plurality of rigid sector members, a plurality of non-resilient bridging and adjusting pieces in which the ends of said sector members are mounted, and a tapered member controlled from the exterior of the cylinder engaging said bridging and adjusting pieces for simultaneously controlling the same.

6. A piston packing comprising a plurality of rigid sector members, a plurality of non-resilient bridging and adjusting pieces in which the ends of said sector members are mounted, positive means for simultaneously adjusting said bridging and adjusting pieces, and means for retracting said sector members against said bridging and adjusting pieces.

7. A piston packing comprising a plurality of rigid sector members, a plurality of non-resilient bridging and adjusting pieces in which the ends of said sector members are mounted, positive means for simultaneously adjusting said bridging and adjusting pieces, and springs for retracting said sector members against said bridging and adjusting pieces.

8. A piston packing comprising a plurality of rigid sector members, a plurality of non-resilient bridging and adjusting pieces in which the ends of said sector members are mounted, positive means for adjusting said bridging and adjusting pieces and sector members, and means for preventing circumferential motion of said sector members.

In testimony whereof, I have hereunto signed my name in the presence of two witnesses.

ROBERT A. FOWDEN.

Witnesses:
JAS. C. WOBENSMITH,
PERCIVAL K. REED.